United States Patent
Arnold

(10) Patent No.: US 11,328,393 B2
(45) Date of Patent: May 10, 2022

(54) METHOD AND DEVICE FOR DISPLAYING HIGH-DYNAMIC SONAR OR RADAR DATA

(71) Applicant: THALES, Courbevoie (FR)

(72) Inventor: Andreas Arnold, Sophia Antipolis (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/257,845

(22) PCT Filed: Jul. 4, 2019

(86) PCT No.: PCT/EP2019/067995
§ 371 (c)(1),
(2) Date: Jan. 4, 2021

(87) PCT Pub. No.: WO2020/007981
PCT Pub. Date: Jan. 9, 2020

(65) Prior Publication Data
US 2021/0295479 A1    Sep. 23, 2021

(30) Foreign Application Priority Data

Jul. 5, 2018  (FR) ...................................... 1800714

(51) Int. Cl.
*G06T 5/00* (2006.01)
*G06T 3/40* (2006.01)
(Continued)

(52) U.S. Cl.
CPC ............... *G06T 5/007* (2013.01); *G06T 3/40* (2013.01); *G06T 5/009* (2013.01); *G06T 5/50* (2013.01);
(Continued)

(58) Field of Classification Search
CPC ........... G06T 5/007; G06T 2207/10044; G06T 2207/20208
See application file for complete search history.

(56) References Cited

U.S. PATENT DOCUMENTS

2002/0196177 A1* 12/2002 Johansson ................ G01V 3/12
                                                                342/22
2009/0121923 A1*  5/2009 Mainds .................... G01S 7/298
                                                                342/185
(Continued)

FOREIGN PATENT DOCUMENTS

CN        104408752 A     3/2015
EP       0 120 488 B1    12/1986
(Continued)

OTHER PUBLICATIONS

Mertens, et al., "Exposure Fusion", Computer Graphics and Applications, pp. 382-390, Oct. 29, 2007.
(Continued)

*Primary Examiner* — Phi Hoang
(74) *Attorney, Agent, or Firm* — BakerHostetler

(57) ABSTRACT

A method and a device for displaying a set of high dynamic range sonar or radar data are provided. The method makes it possible to visualize scalar data tables having a high dynamic range. The method consists in producing a first image in colors of essentially uniform shade hue and saturation for ranges of values exhibiting a low dynamic range, in creating a second image containing only the high-amplitude information that is invisible in the first image, in subjecting the second image to a non-linear low-pass filtering creating a halo that becomes all the greater as the information increases in amplitude, then in rendering this second image according to a color map that is of constant luminance but with strong variations of hue and of saturation. These two images are then combined by a weighted average and renormalized in terms of luminance.

13 Claims, 9 Drawing Sheets

(51) Int. Cl.
 *G06T 5/50* (2006.01)
 *G06T 11/00* (2006.01)
(52) U.S. Cl.
 CPC .. *G06T 11/001* (2013.01); *G06T 2207/10024* (2013.01); *G06T 2207/10044* (2013.01); *G06T 2207/20208* (2013.01); *G06T 2207/20221* (2013.01)

(56) References Cited

U.S. PATENT DOCUMENTS

| | | | | |
|---|---|---|---|---|
| 2012/0230918 | A1* | 9/2012 | Dobosz | A61K 49/0034 424/9.6 |
| 2016/0195877 | A1* | 7/2016 | Franzius | G06K 9/38 348/47 |
| 2017/0247092 | A1* | 8/2017 | Foster | G01N 29/265 |
| 2018/0204085 | A1* | 7/2018 | Chennubhotla | G16H 50/20 |
| 2020/0107710 | A1* | 4/2020 | Duckett, III | G02B 27/283 |

FOREIGN PATENT DOCUMENTS

| | | |
|---|---|---|
| EP | 1 360 522 B1 | 9/2008 |
| EP | 3 340 167 A1 | 6/2018 |
| WO | 2007/113824 A2 | 10/2007 |
| WO | 2015/184300 A1 | 12/2015 |

OTHER PUBLICATIONS

Shaw, "Digital filtering/enhancement/analysis of geologic Long-Range inclined asdic (GLORIA) acoustic imagery", Image Processing Algorithms and Techniques, vol. 1244, p. 429-435, Feb. 12, 1990.

Duda, "Zastosowanie techniki HDR do obrazów pozyskiwanych z sektorowego sonaru skanującego", Biuletyn WAT vol. LX, No. 3, 2011.

Durand, et al., "Fast Bilateral Filtering for the Display of High-Dynamic-Range Images", SIGGRAPH '02: Proceedings of the 29th annual conference on Computer graphics and interactive techniques, 2002.

Lambers, et al., "Adaptive Dynamic Range Reduction for SAR Images", 7th European conference on synthetic aperture radar (EUSAR), Jun. 2008.

Hisanaga, et al., "Compression Method for High Dynamic Range Intensity to Improve SAR Image Visibility", Proc. International MultiConference of Engineers and Computer Scientists 2011, vol. 1, IMECS 2011, Mar. 16-18, 2011.

Debevec, et al., "Recovering High Dynamic Range Radiance Maps from Photographs", SIGGRAPH '08: ACM SIGGRAPH 2008, Article No. 31, Aug. 2008.

Spencer, et al., "Physically-based glare effects for digital images", SIGGRAPH '95: Proceedings of the 22nd annual conference on Computer graphics and interactive techniques, (1995).

* cited by examiner

METHOD AND DEVICE FOR DISPLAYING HIGH-DYNAMIC SONAR OR RADAR DATA

CROSS-REFERENCE TO RELATED APPLICATIONS

This application is a National Stage of International patent application PCT/EP2019/067995, filed on Jul. 4, 2019, which claims priority to foreign French patent application No. FR 1800714, filed on Jul. 5, 2018, the disclosures of which are incorporated by reference in their entirety.

FIELD OF THE INVENTION

The invention relates to the field of sonar or radar. More specifically, the invention relates to a method and a device allowing the visualization of data with an amplitude dynamic range that is too great to be directly rendered on a visualization means such as a screen or paper after printing.

BACKGROUND

Sonar or radar data are characterized by the fact that their dynamic range is very great, easily 60 dB or more. Two types of renderings of these data are conventionally used: a logarithmic scale rendering or a rendering of the amplitude of the signal after normalization and clamping.

Logarithmic scale rendering has the advantage of well compressing the dynamic range of the images to a range that can be rendered on the screen. Nevertheless, this rendering has the drawback of hampering the intuitive interpretation of the image, given that the amplitude of the signal is not visualized.

In amplitude rendering, the most common approaches are part of a family of methods known in the community as "low dynamic rendering" (LDR). The data to be visualized are first of all normalized by the application of an automatic gain control or a temporally variable gain, are then clamped, then transcoded to a color through a so-called "transcoding" (or "color mapping") function, the luminance of said color conventionally following a non-linear "tone mapping" law. The clamping is justified by the fact that only a few points in the image (less than 0.5% typically) are really at very high levels, most of the signal being concentrated in a more reduced dynamic range (of the order of 10 dB) which is that highlighted by the rendering. The drawback with this method is that the clamping gives the same significance to data of very high intensity and data of intermediate intensity but nevertheless too great to be correctly rendered on the visualization means envisaged (screen, paper). Indeed, these important data, although with statistically little presence in the image, are in reality carriers of information because they are strong echoes betraying the presence of an object or of a target.

More recent attempts use so-called high dynamic rendering (or HDR) techniques allowing images acquired with different gain levels to be mixed to obtain a single unique image, in order to locally prioritize the gain level allowing the details to be best seen. This unique image is displayed with a lower dynamic range suited to visualization means. The drawback with this technique, taken as such, is that isolated points of very high intensity will, despite everything, be difficult to perceive, because their spatial extent remains too small.

The problem with these LDR and HDR approaches is that it is not possible to visualize data whose dynamic range may exceed 30 dB, because that widely exceeds the dynamic range admissible by a common display medium (screen, paper) or by the human eye. Moreover, these techniques do not allow the visualization of images with high dynamic range in which points of high intensity are statistically rare (typically less than 0.5% of cases), these points of high intensity having a small spatial extent in the image. In this situation, the direct rendering of the image with a color map representing the amplitude of the signal to be represented to a linear gray level is problematic. Indeed, most of the signal being of low intensity, except for a few rare bright points, the image would appear as overall black.

To better understand the drawbacks of the abovementioned techniques, the technical problem to be resolved is formulated as follows.

Let $I(x, y)$ be the image datum from a sensor, a real datum situated within an interval $[A, B]$. In the case where the image is from a radar or a sonar, $\rho(x, y)$ denotes the distance from the point of coordinates $(x, y)$ to the sensor at the moment when the information corresponding to said point is acquired. Time and space are linked in radar and sonar by the relationship $\rho = ct/2$ in which $\rho$ is the distance from the target to the sensor, $t$ is the round-trip time of the wave and $c$ is the speed of the wave. The distance $\rho$ is therefore also proportional to a time.

The datum displayed as an output $O(x, y) = [r(x,y); g(x,y); b(x,y)]^T$ is the datum displayed (a vector of three components between $[0,1]$ coding the red $r(x,y)$, green $g(x,y)$, blue $b(x,y)$ components of the color displayed). The datum displayed is assumed to lie within the interval $[0,1]$ whereas the datum from the sensor is assumed to lie within an interval $[A, B]$. The value $B-A$ is the dynamic range of the input signal.

In the problem described in which the signal is of high dynamic range, then $B-A \gg 1$ (typically $B-A$ can go up to $10^{12}$ in sonar or in radar, even much more).

Depending on the image processing approach retained, the coding of the data is as follows:
  in the so-called naïve solution of simple coding by color, the coding of the information by color consists in associating a color at an intensity $I(x, y)$ with a color map shrewdly chosen so that the low intensities are in given tones (for example red tones), the medium intensities are in other tones (for example green tones), and finally high intensities are in yet other tones (for example blue tones). The output datum $O(x, y)$ can be represented by the equation:

$$O(x,y) = c(I(x,y))$$

in which 'c' represents the color map.

The drawback with this solution of simple coding by color is the difficulty in reading the image through an overload of colors, as well as perceptual problems and personal tastes of the operators. There is also the custom among operators of manipulating an essentially monochrome image (in hues of gray, green, or amber) given that the sonar or radar data has been displayed until recently (the beginning of the 2000s) on monochrome cathode ray screens or printed on thermal paper: it is the luminance of the color which, essentially, codes the signal amplitude information.

In the LDR "Low Dynamic Rendering" approach, the data to be displayed conventionally undergoes a processing comprising operations of normalization (1), of clamping (2) and of transcoding (3). As input, the datum (2D) to be displayed $I(x, y)$ lies within an interval $[A, B]$ and is proportional to the measured signal. The processing consists in:

(1) the normalization of the data N(x, y) with respect to a reference value. The latter can be done in the sonar or radar domain, i.e.:

1.a. by a time-variable gain (TVG), that is to say by a predefined law f(p(x,y)) dependent on the geometry of the problem:

$$N(x,y)=(I(x,y)-A) \times f(\rho(x,y))$$

1.b. by a local automatic gain control (AGC) which amounts to applying a high-pass filter h to the signal by convolution or by recursive filtering in order to eliminate a slowly variable average component:

$$N(x,y)=(I(x,y)-A)*h(x,y)$$

In both cases 1.a and 1.b, the function f or h is shrewdly chosen so that, on average, N(x, y) is close to a target value m defined as a parameter of the problem. This value is taken equal to 1 hereinafter in the description.

The time-variable gain or the local automatic gain control can be implemented either in an analog electronic circuit such as a data formatting stage (before analog-to-digital conversion, (ADC), in the case where the ADC component is of low dynamic range), or digitally before display.

The exact manner in which the two functions f or h are calculated depends on the sensor and can vary in the details without affecting the spirit of the processing.

(2) The clamping of the data E(x, y) to force them to lie within an interval [0, T] with m<T:

E(x, y)=min(N(x, y), T) in which the value of T is a parameter of the problem.

(3) The transcoding of the data to a color map:

$O(x, y)=c(E(x, y))$ with $[0,T] \mapsto [0,1]^3$ chosen shrewdly to best perceive the data. The function c is the "color map" used for the rendering of the data.

As output, the color 2D image 0(x, y) is displayed.

A first drawback with the LDR approach is the loss of information on the original value of the signal following the normalization step (1). Indeed, the data are rounded to an average value m which is not necessarily within the original interval [A, B]. There is therefore no longer a direct link between the "color" presented on the screen and the measured intensity of the signal.

A second drawback with this method is the clamping step (2) which brings all the data above the value m to the same color. This problem is highly detrimental for identifying targets characterized by very significant intensities I(x, y), which, after clamping, will be represented as the same as other targets of much lower intensity, but nevertheless rounded also to the value T. It is therefore impossible to distinguish very strong echoes from echoes of intermediate intensity, because the two types are generally greater than T and are therefore represented in the same way. Ideally, the value of T must be as great as possible in order for the probability of finding a value N(x, y)>T to be as low as possible, but that is not always possible.

FIG. 1 illustrates the abovementioned drawbacks of the normalization and clamping functions (before transcoding) on a simplified example of a 1D signal. It can be seen, on the bottom curve, that, after the clamping, the two high intensity peaks are represented with the same value while they are nevertheless of different intensity in the original signal as shown on the top curve.

Some enhancements are proposed for this approach. To describe them, L will be used to denote the luminance associated with the color c, which is defined in the standard ITU BT.709 by the following equation:

$$L(c)=0.2126r+0.7152g+0.0722b$$

in which $c=[r; g;b]^T$ with r, g, b the triplet of red, green, blue colors (of values coded between 0 and 1). Hereinbelow, L(x, y) will be used to denote the luminance associated with the color coded on the pixel of coordinates (x, y). Also, S(c) will be used to denote the saturation of the color c, taken between 0 and 1, and H(c) will be used to denote the hue of the color c.

A first enhancement to the above LDR rendering algorithm consists naively, in the transcoding step (3), in choosing c in such a way that L follows a linear law as a function of $c(E(x, y))=[r(x, y); g(x, y); b(x, y)]^T$, which also demands the choice of a clamping value T very close to zero in order to allow the human eye to see the interesting data in the image. Now, it is desirable to have T as great as possible since this term regulates the perceptible dynamic range in the visualization means.

Another enhancement is the use, in the transcoding step (3), of a method called "tone mapping", which is nothing more than the application of a nonlinear function to E(x, y). In the case of data other than sonar or radar data, for example photographic images, a law which is conventionally used is gamma compression:

$L(x, y)=E(x, y)^\gamma$ in which the parameter y regulates the contrast. A low value of y gives a lower contrast and therefore a more "mat" image but increases the visibility of zones of the imaging which the signal I(x) is low.

Another way of performing the "tone mapping" is to switch to logarithmic scale. Thus, displaying the values in decibels with a linear ramp of colors in the logarithmic domain is an example of log-linear tone mapping:

$L(x, y)=K_1 \cdot \log L(x, y)+K_2$ with $K_1$ and $K_2$ parameters of the law.

In the case of active sonar or radar data, the function c is generally chosen so that the associated luminance L follows a substantially log-sigmoid law, that is to say that if m=1, then the trend of L(x, y) as a function of E(x, y) follows a relationship close to:

$$L(x, y) = \frac{E(x, y)^\gamma}{E(x, y)^\gamma + 1}$$

with γ a parameter regulating the slope of the function L around E(x, y)=1 (this slope has the value γ/4 and is left generally as an operator setting parameter, since it corresponds perceptually to the contrast: the lower the value of γ, the more legible the weak signal zones I(x, y)). The form of this law is justified physically by the Weber-Fechner law which dictates that the human perception of a large number of stimuli, including sight, increases logarithmically with the intensity of the stimulus, which explains for example why the magnitude of the stars is taken as a logarithmic scale. The law therefore approaches a logarithmic law for values close to 1, and then moves away from that for higher values.

In both cases, the fact of acting on the parameter γ allows the useful interval of the data to be somewhat extended, that is to say T to be increased, but this increase remains limited to values which are not sufficient to be really useful.

Enhancements exist also on the HDR rendering approach in optical imaging and in sonar/radar. By using I(x, y) to denote the raw image picked up by the sensor and L(x, y) to denote the associated luminance (I=L in the case of an image in gray levels), the HDR rendering in optical imaging consists in acquiring a plurality of images $I_1(x, y), \ldots I_n(x, y)$ of the same scene:

either by different settings of the sensor (exposure, aperture, gains) with acquisitions performed consecutively in time within a very short interval in which $I_k(x, y)$ therefore applies, the settings of the sensor being set to a luminance interval $[A_{k-1}, A_k]$ with $A_0=A$ and $A_n=B$. or by having a single image $I(x, y)$ acquired then subdividing the interval $[A, B]$ into a plurality of luminance intervals $[A_0=A, A_1], [A_2, A_3], \ldots, [A_{n-1}, A_{n-1}]$, $[A_{n-1}, A_n=B]$, then by constructing:

$$I_k(x, y) = \begin{cases} I(x, y) & \text{if } L(x, y) \in [A_k, A_{k+1}] \\ 0 & \text{otherwise} \end{cases}$$

Then, an image of lower dynamic range is constructed:

$$O(x, y) = \sum_{k=0}^{k=n-1} w_k(x, y) f(I_k(x, y))$$

with $\Sigma_{k=0}^{n-1} w_k(x,y)-1$, $w_k(x, y)$ being a weight shrewdly chosen to prioritize, at (x,y), the data $I_k$ with k chosen such that $I_k(x, y)$ is as close as possible to the middle of the interval $A_{k-1}, A_k$ and the function f performing the "tone mapping" of the image to bring it to components within the interval $[0,1]$. In concrete terms, this formulation makes it possible to prioritize, at a pixel of coordinates (x,y), the value k for which the image $I_k(x, y)$ gives an intensity which is neither under- nor over-exposed. However, a fundamental drawback is that the luminance of the object is no longer necessarily proportional to the intensity of the raw datum.

The following documents should be considered as known HDR rendering and enhanced rendering techniques in sonar, radar and in optics: Jaroslaw Duda, "*Zastosowanie techniki HDR do obrazów pozyskiwanych z sektorowego sonaru skanującego*", Biuletyn WAT vol. LX, No. 3, 2011; Fréd Durand and Julie Dorsey, "*Fast Bilateral Filtering for the Display of High-Dynamic-Range Images*". ACM Transactions on Graphics, 2002, 21, 3, 257-266; P. E. Debevec, J. Malik, *Recovering High Dynamic Range Radiance Maps from Photographs*, International Conference on Computer Graphics and Interactive Techniques, Addison-Wesley Publishing Co., New York, USA, 1997; Martin Lambers, Andreas Kolb, "*Adaptive Dynamic Range Reduction for SAR Images*", 7th European conference on synthetic aperture radar (EUSAR), 2008; Satoshi Hisanaga, Koji Wakimoto and Koji Okamura, "*Compression Method for High Dynamic Range Intensity to Improve SAR Image Visibility*", Proc. International MultiConference of Engineers and Computer Scientists 2011 vol. 1, IMECS 2011, Mar. 16-18, 2011, Hong Kong.

The method described in the article by P. E. Debevec has been adapted from optics for sonar by J. Duda. A similar method, that of F. Durand and J. Dorsey has been adapted from optics for the field of radar by M. Lambers and A. Kolb and applies equally to sonar. Another relatively similar approach has been proposed by S. Hisanaga, K. Wakimoto and K. Okamura also in the field of radar.

The following patent applications are cited as proposing HDR rendering solutions:

CN104408752B from XIDIAN University describes an image compression method with high dynamic range, based on a mixed tone mapping algorithm; and WO2007113824 A2 describes a method to facilitate the volume visualization of synthetic images from radar data with high dynamic range.

To sum up, the drawbacks of the existing solutions are then: for the naïve method: the difficulty of finding a color map which is suited to the problem and legible by the operator who is used to seeing amplitude data essentially coded by the luminance (a greater amplitude of the signal gives a greater luminance of its representation on the screen).

For the conventional LDR method (normalization, clamping, transcoding): the latter allows only images having a low useful dynamic range to be displayed. This dynamic range can be increased by use of tone mapping techniques, but does not however allow the dynamic range to be increased satisfactorily.

For HDR rendering: although allowing the dynamic range to be increased satisfactorily, this approach has limitations for data which exhibit peaks of intensity of very small spatial size (one or two pixels wide). Although they are rendered with a different color by a suitable method, these peaks are so small that they often difficult to see, even at full resolution, and even more difficult if the image undergoes a scale reduction ("zoom out").

It is therefore necessary to provide a solution which does not exhibit the abovementioned drawbacks, and which allows points of high intensity to be rapidly revealed while allowing a suitable and reliable reading of an image where the intensity is low, and regardless of the image visualization scale.

SUMMARY OF THE INVENTION

The present invention addresses this need.

The object of the present invention is to propose a solution which consists essentially in combining two images: one corresponding to low dynamic ranges, the other corresponding to higher dynamic ranges. The two images are rendered with hues of different colors in order to be able to distinguish, after the merging, which original image is the origin of the information. Advantageously, the solution is distinguished from a conventional high dynamic range rendering by the fact that the image containing the information corresponding to the high dynamic ranges, has previously undergone a preprocessing allowing the spatial spread of the strong echo points to be increased, the size of this spread increasing with the amplitude of the signal to be represented, while also being controlled by the scale of visualization of the image on the screen: global view or local view with strong enlargement, in order to allow, in the first case, all the echoes of a large zone to be rapidly highlighted, and, in the other case, the structure of the points of strong echoes, called "bright points", to be highlighted in the image of the targets. This preprocessing is also fundamentally configured so that very strong echoes do not disrupt the reading of the zones of very low intensity situated in proximity, which allows the image to be understood in its entirety. The preprocessing is also configured so that the spatial spread of the bright points can optionally vary with the scale of visualization of the image, allowing, on the smallest scales (detail images), perception of the configuration of the bright points of the target to allow the operator to perform a classification task, and allowing the entire target to be highlighted in the more coarse scales, in order to ensure a detection task.

The invention in particular allows strong echoes to be rapidly highlighted, the index of targets to be assessed over a wide dynamic range, and the structure of the distribution of bright points of a target to be analyzed.

To achieve this objective, the method of the invention for visualizing imaging data with high dynamic range (typically sonar or radar) allows for a pixel-by-pixel weighted average of two images, one corresponding to low-intensity data, and the other to high-intensity data, the two images being rendered with two distinct color maps in order to highlight the nature of the information to a given pixel (low or high intensity), the high-intensity image undergoing low-pass filtering in which the impulse response has a width that increases with the amplitude of the signals to be represented and varies with the scale of visualization of the image, so as to highlight strong echoes, allow for a visual reading of the distribution of bright points, and allow for rapid and visual estimation of the intensity of a bright point.

The invention offers the following advantages over the state of the art: it highlights isolated points of high intensity without disrupting the visibility of points of low intensity nearby; it allows for a direct reading of the intensity, possibly relative, of the points; it also allows, by a shrewd use of the scale of visualization in the non-linear filtering stage, an operator to perform tasks of echo detection and analysis of the structure of the echoes simply through manipulation of the scale of visualization.

The present invention is advantageously applicable in the field of sonar or radar. In the specific field of sonar, it applies equally to imaging sonar (background imaging, for hydrographic or military purposes, for example mine warfare), and to sounder data, possibly multibeam, such as the "multibeam echo sounders" (MBES), or the "anti-submarine warfare" (ASuVV) sonars, or even to any display with high dynamic range such as the displays known as Active Geographic Plot (AGP) described in the patent application EP120488B1 or Energy Geographic Plot (EGP) described in the patent application EP1360522B1. In the field of radar, it is particularly prescribed in the visualization of data with strong contrast, as is encountered in maritime surveillance.

In one embodiment, the invention consists of a method for visualizing matrix data/data containing values of high dynamic range taken from a known interval [A, B], allowing the matrix to be transformed into a two-dimensional table containing vectors of size '3' representing colors that can be displayed on a visualization device such as a screen, or that can be printed. The table results from the combination, through a weighted average, of a first "low-intensity" color image called image, in which the colors represent amplitude information situated between [A, A+$T_1$], and a second "high-intensity" color image in which the colors represent amplitude information situated between [A, A+$T_2$], and in which all the data greater than A+$T_2$ are represented in the same color as the data of value A+$T_2$.

Advantageously, the method is characterized in that the "high-intensity" image undergoes a non-linear low-pass filtering such that the width of the zone, in which the absolute value of the local impulse response of the filter is non-negligible, increases with the local intensity of the image at that point, creating a halo around points of high intensity, a halo whose size increases with the local intensity.

Advantageously, the non-linear low-pass filter and the palettes of colors used for the rendering of the "low-intensity" and "high-intensity" images are shrewdly configured to allow an operator to more easily perform the following tasks:

visualizing data of low and high intensity simultaneously;
detecting and interpreting the spatial disposition of points corresponding to the signal of high intensity (often associated physically with targets); the probability of this detection by an operator is substantially increased by the increase in their spatial size by virtue of the non-linear low-pass filtering step, which then allows zones of high intensity, previously invisible because they are too small, to be seen; reading the level of intensity of the points through the color and the luminance, and by the size of the halos around echoes obtained by virtue of the non-linear filtering step.

To obtain the results sought, an image rendering method for matrix data from an input signal having a high dynamic range is proposed. The method implemented by computer comprises steps consisting in:

generating, from the matrix data, a first color image called "low-intensity image", in which the colors represent low intensities of the input signal;

generating, from the matrix data, a second color image called "high-intensity image" in which the colors represent high intensities of the input signal, said step comprising at least one filtering step consisting in applying, at each point (x, y) of the image, a non-linear low-pass filter of unimodal impulse response, centrally symmetrical with respect to the point of coordinates (0,0);

generating a merged color image combining, point-for-point, the low-intensity image and the high-intensity image in an average, weighted by a constant factor, of each of the color components;

normalizing the combined image so that, at each point, the luminance of the resulting image is equal to the luminance of the low-intensity image; and redimensioning the resulting image on at least one axis of the matrix.

According to embodiments:

the generation of the low-intensity image comprises steps consisting in constructing a first temporary matrix equal to the original image I from which is subtracted its minimum A, then in constructing a second temporary matrix equal to the first, except for the inputs with values higher than a predefined threshold $T_1$, said inputs being set at $T_1$, then in constructing a low-intensity color image from the second temporary matrix, by application of a first palette of colors.

The generation of the high-intensity image comprises steps consisting in:

calculating a third temporary matrix, equal at all points to the first temporary matrix, except for the inputs with values lower than the predefined threshold $T_1$, said inputs being set at zero, and except for the inputs with values higher than a threshold $T_2$, said inputs being set at $T_2$;

calculating the maximum of this third temporary matrix;

applying, to the third temporary matrix a non-linear low-pass filtering of unimodal impulse response, centrally symmetrical with respect to the point of coordinates (0,0);

dividing, point-by-point, the result of the non-linear low-pass filtering by the overall maximum of this result, and multiplying by the maximum of third temporary matrix; and constructing a high-intensity color image by application of a second palette of colors to the result of this division.

More specifically, the local impulse response of the non-linear low-pass filter has the following properties: it is splittable, it is maximal at the origin, it decreases symmetrically around the origin, and its "typical widths", corresponding to the dimensions along the two axes of the matrix of the image of the zone where said response is substantially non-zero, increase with the intensity of the signal at the input of the stage.

In variant embodiments:
the redimensioning of the resulting image consists in an upsampling or a downsampling on at least one of the two axes, by factors which are either predefined, or left to the control of the operator;
the typical widths of the impulse response of the non-linear filter on the two horizontal and vertical axes of the matrix of the image depend on the spatial resolution of the input data along these two axes;
the typical widths of the impulse response of the non-linear filter on the two horizontal and vertical axes of the matrix of the image depend on the rate of upsampling or downsampling rate of the image on the two axes;
the palette of colors used to generate the low-intensity image is of essentially constant hue and saturation and the coding of the data is performed by a variation of luminance, which increases with the intensity of the signal;
the input signal is preconditioned so that its average on a local horizon is constrained to a target value m, and in which the luminance of the palette of colors used for the low-intensity image follows a log-sigmoid law. More specifically, if the intensity of the signal is denoted x, then the luminance obeys the law $(x/m)^\gamma/((x/m)^\gamma+1)$ with $\gamma$ a constant parameter that is either hard-coded or supplied by the operator as a setting parameter;
the palette of colors used to generate the high-intensity image is, on the one hand, essentially of zero luminance for $I(x, y) \leq A+T_1$ and increases with $I(x, y)$, and, on the other hand, of variable hue and saturation, the variation of hue and of saturation coding signal intensity information;
the impulse response of the non-linear filter is a 2D Gaussian function whose standard deviation is the "typical width" parameter.

The invention also covers an image rendering device for matrix data from an input signal having a high dynamic range, which comprises means for implementing the steps of the method claimed in its different variants.

The invention can operate in the form of a computer program product which comprises code instructions allowing the steps of the method claimed to be performed when the program is run on a computer.

BRIEF DESCRIPTION OF THE DRAWINGS

Different aspects and advantages of the invention will emerge in support of the description of a preferred but nonlimiting mode of implementation of the invention, with reference to the figures below.

DETAILED DESCRIPTION

The following description is based on examples in the field of sonar data to allow for a good understanding of the principles of the invention, and a concrete application, that is in no way limiting thereto and should allow the person skilled in the art to apply modifications and implementation variants while keeping the same principles.

Figure 1:
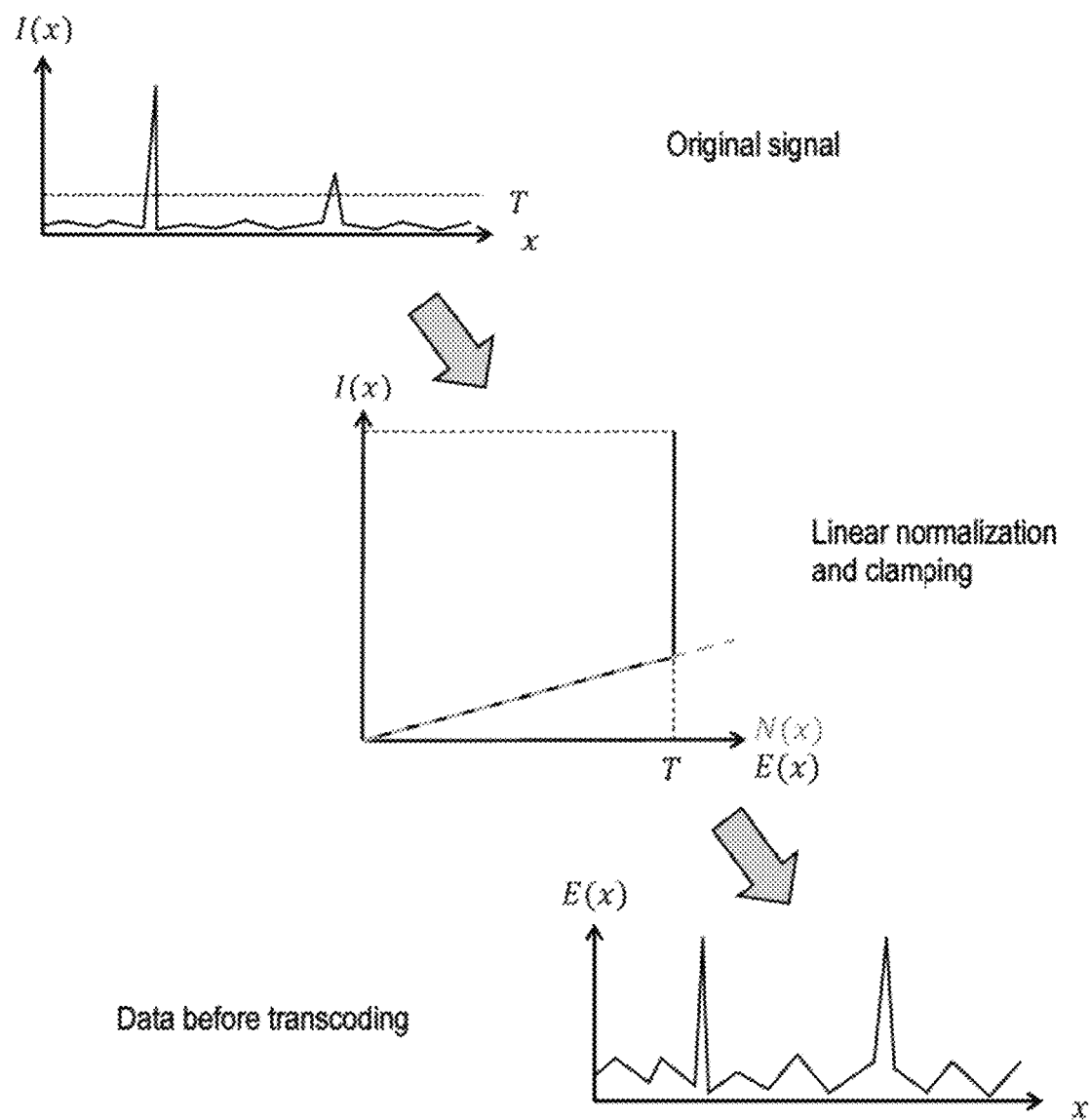
FIG. 1 illustrates the normalization and clamping functions on a simplified example of a 1D signal.
Figure 2:
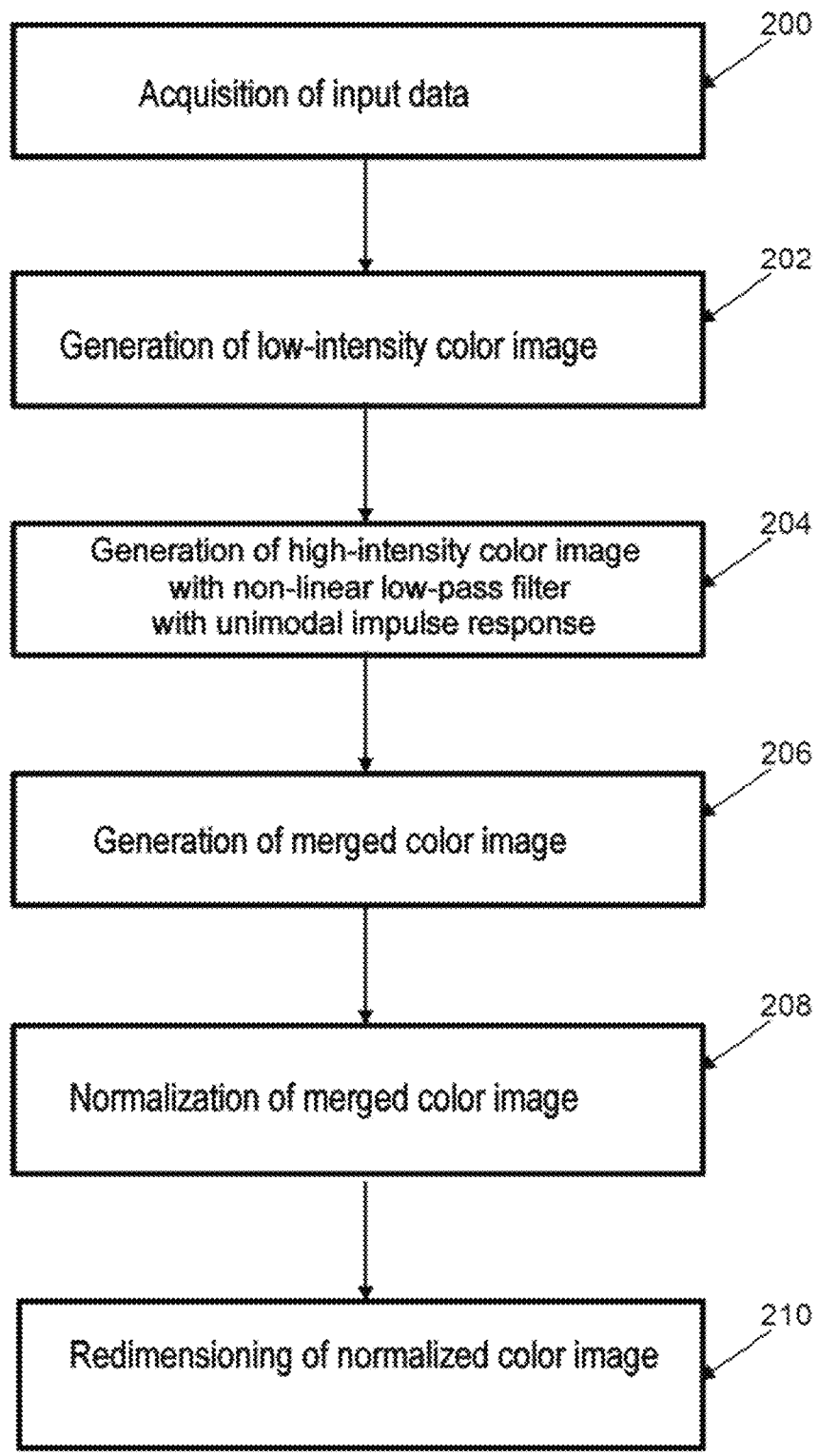
FIG. 2 illustrates general steps of the method for displaying sonar or radar data with high dynamic range according to an embodiment of the invention.

Moving onto FIG. 2, general steps of the method allowing the display of sonar or radar data with high dynamic range according to an embodiment of the invention are described.

The method begins with a step (200) of acquisition of input data. In one embodiment, the input is a function
$I: \mathbb{R}^2 \mapsto [A, B]; (x, y) \rightarrow I(x, y)$. This function is a 2D image. The value $I(x, y)$ is a scalar value recorded by a sensor (for example, proportional to a voltage in volts), corresponding for example to an amplitude of an acoustic or radiofrequency wave. [U] is used to denote the unit of the values used in I. In a particular implementation, the 2D image is a 2D matrix in which each input of the matrix contains a scalar.

For resolutions, the image has $\rho_x$ (respectively $\rho_y$) on the axis x (respectively y), these resolutions being in physical units, such as distance units or angular units. The main axes of the image do not necessarily physically correspond to orthogonal axes.

In a subsequent step (202), the method allows a first color image, called "low-intensity image", to be generated in which the colors correspond to low intensities of the input signal, and denoted $I_{lo}(x, y)$.

In a subsequent step (204), the method allows a second color image, called "high-intensity image", to be generated in which the colors represent high intensities of the input signal. Advantageously, the generation of the second color image comprises at least one filtering step which consists in applying, at each point (x,y) of the image, a non-linear low-pass filter of unimodal impulse response, centrally symmetrical with respect to the point of coordinates (0,0).

Then, in a subsequent step (206), the method allows a merged color image of the first and second color images to be calculated. The merged color image is obtained by combining, point-for-point, the low-intensity image and the high-intensity image in an average, weighted by a constant factor, of each of the color components.

In a subsequent step (208), the method allows the combined image to be normalized so that, at each point, the luminance of the resulting image is equal to the luminance of the low-intensity image.

Then, the method allows (210) the resulting image to be redimensioned on at least one axis of the matrix. The output is a function $\mathbb{R}^2 \mapsto [0,1]^3; (x, y)=O(x, y)$. This function is a color 2D image corresponding to the image to be displayed. In a particular implementation, the 2D image is a 2D table containing, at each input, a three-dimensional vector containing the color components to be displayed.

It is possible that the color components can be considered to be coded between 0 and 1, but an exact interval used in practice can be different, for example from 0 to 255, without affecting the principle of the invention.

Figure 3A:
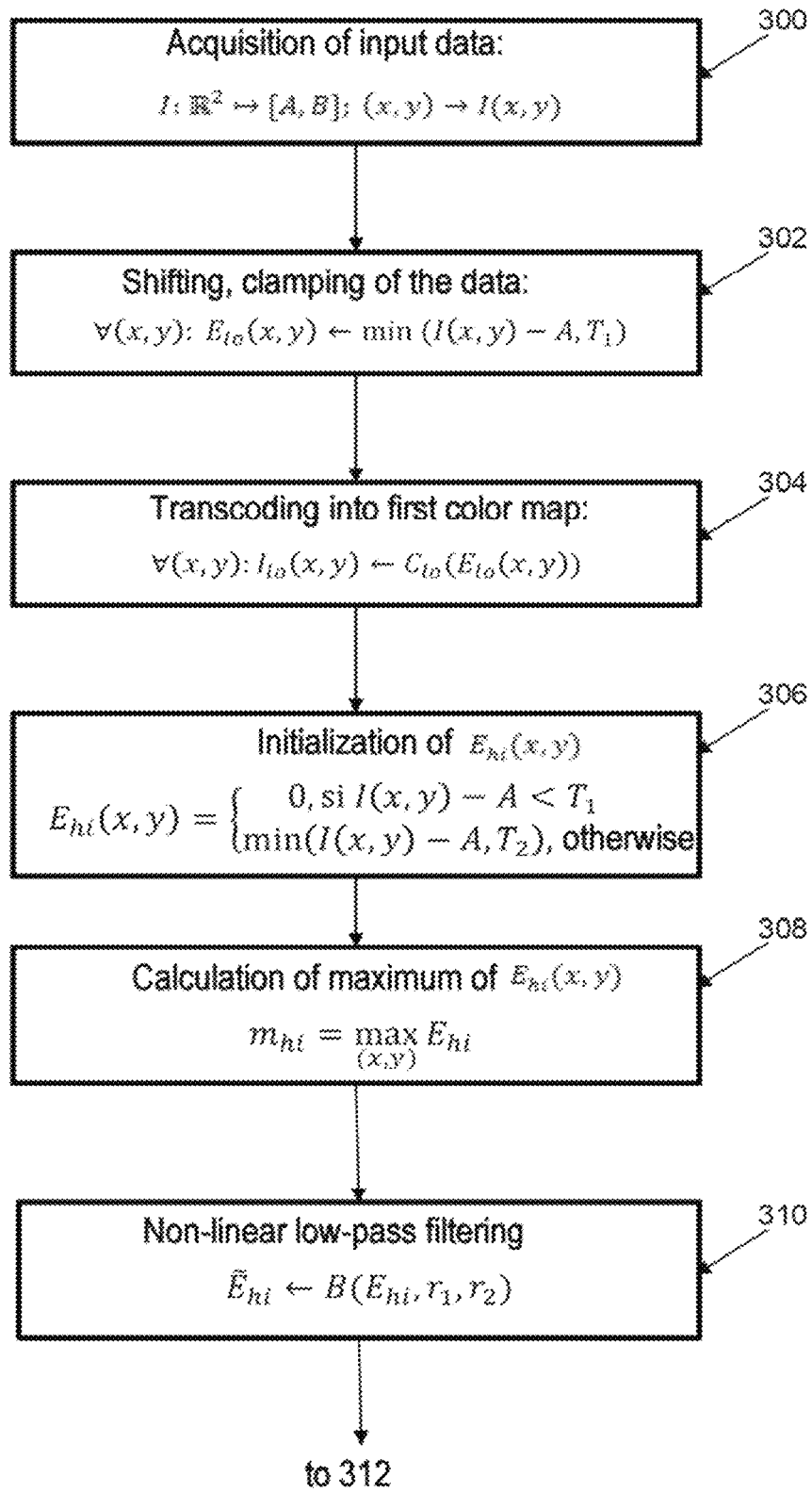
FIGS. 3a and 3b detail the steps of the method of FIG. 2.
Figure 3B:
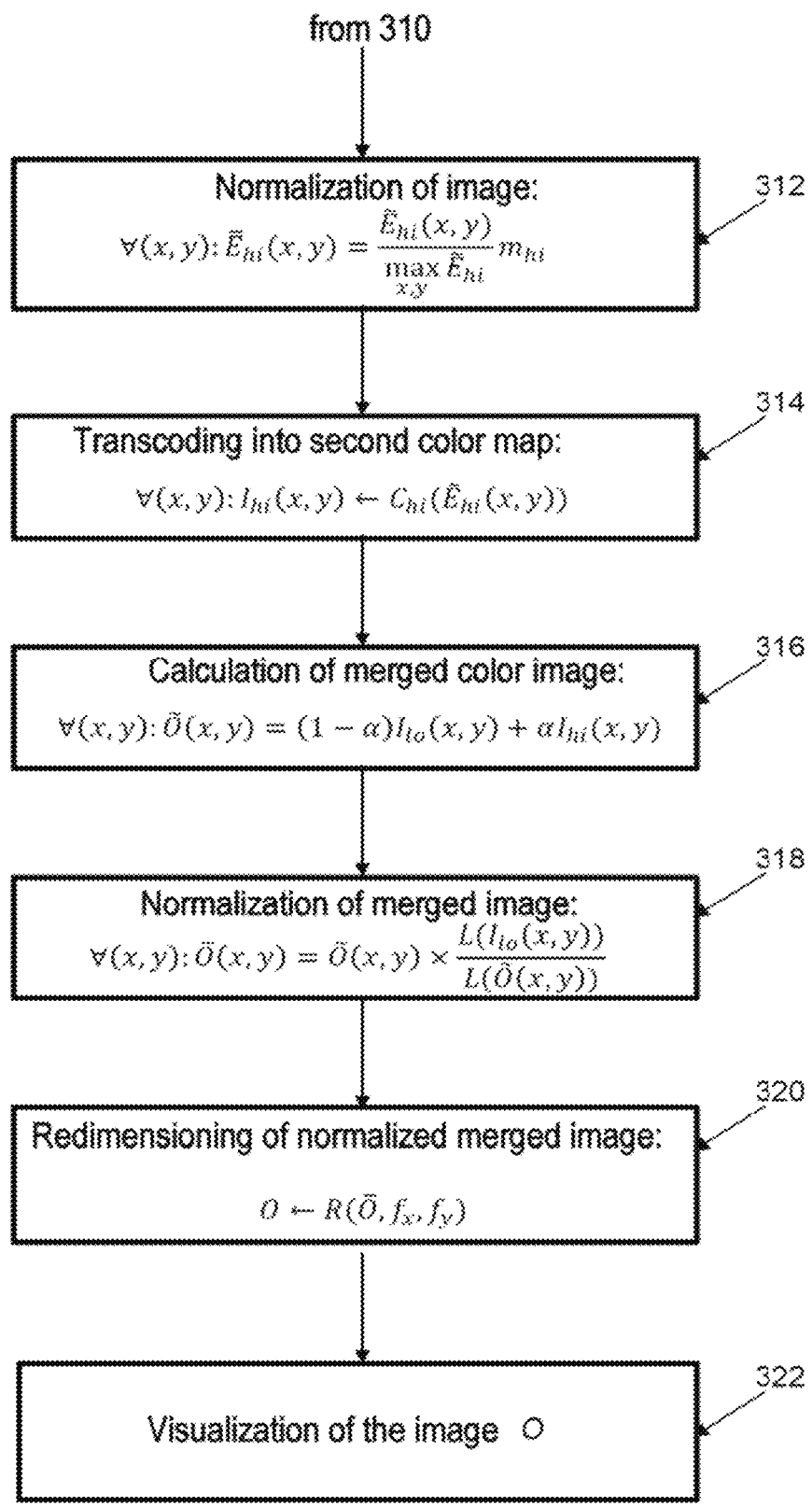
Figure 6A:
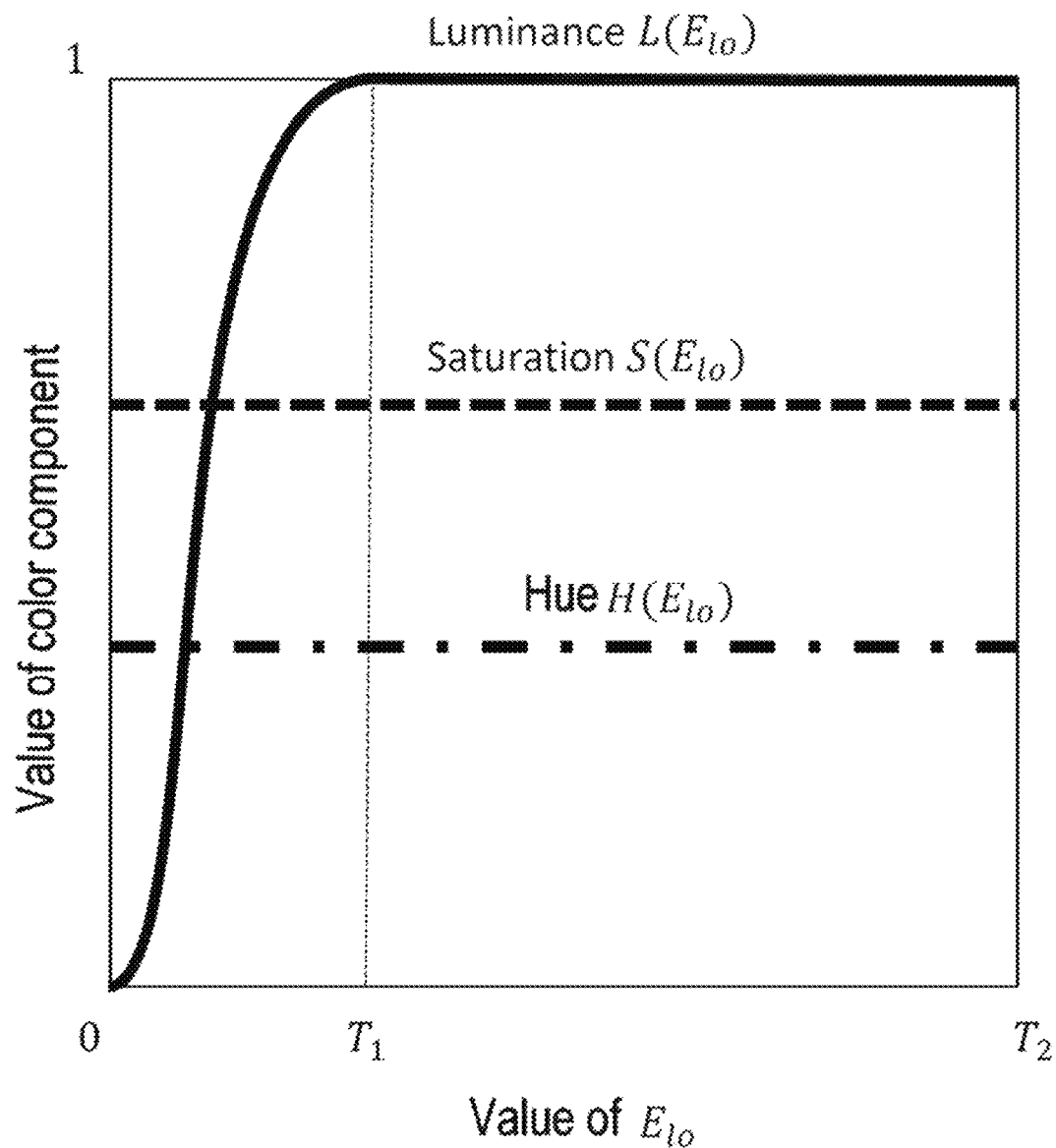
FIGS. 6a and 6b illustrate the trend of the value of each color component for, respectively, the low-intensity image $E_{lo}$ and the high-intensity image $E_{hi}$.

FIGS. 3a and 3b illustrate in more detail the various steps of the method of FIG. 2. In order to allow for a good understanding of the description, the following parameters are defined:

two thresholds $T_1 > 0$ and $T_2 > T_1$ taken in $\mathbb{R}$ and expressed in units [U];

two radii $r_1$ and $r_2$ expressed in pixels, variable as a function of the resolution of the image I and of the display resolution of said image;

a constant weighting factor a e [0,1], either predefined or parameterizable;

a first color map $C_{lo}: [0, T_1] \mapsto [0,1]^3$ such that $C_{lo}(0)=[0; 0; 0]^T$ (black) and $C_{lo}(v)=[1; 1; 1]^T$ for $v=T_1$. For sonar or radar data that have been preconditioned for the average of the image to be substantially constant over a sufficiently large local horizon, the color $C_{lo}(v)$ has, not necessarily but preferably, the following three characteristics illustrated in FIG. 6a:

the luminance $L(C_{lo}(v))$ increases with v (but not necessarily linearly);

the luminance $L(C_{lo}(v))$ increases even more preferentially in a log-sigmoid fashion, that is to say according to a sigmoid with log v.

The hue and the saturation of the color vary little and are ideally constant.

A second color map $C_{hi}:[T_1,T_2] \mapsto [0,1]^3$ such that, given n values $v_i$, $i \in 0 \ldots n$ such that $v_0=T_1$, $v_i < v_{i+1}$ and $v_n=T_2$, and n colors $C_i$ associated with the values $v_i$ then:

if $v_i \leq v < v_{i+1}$ then:

$$C_{hi}(v) = \left(1 - \frac{v - v_i}{v_{i+1} - v_i}\right)C_i + \left(\frac{v - v_i}{v_{i+1} - v_i}\right)C_{i+1}$$

(vector weighted average of the color components);

$C_0 = [0; 0; 0]^T$ (black).

Figure 6B:
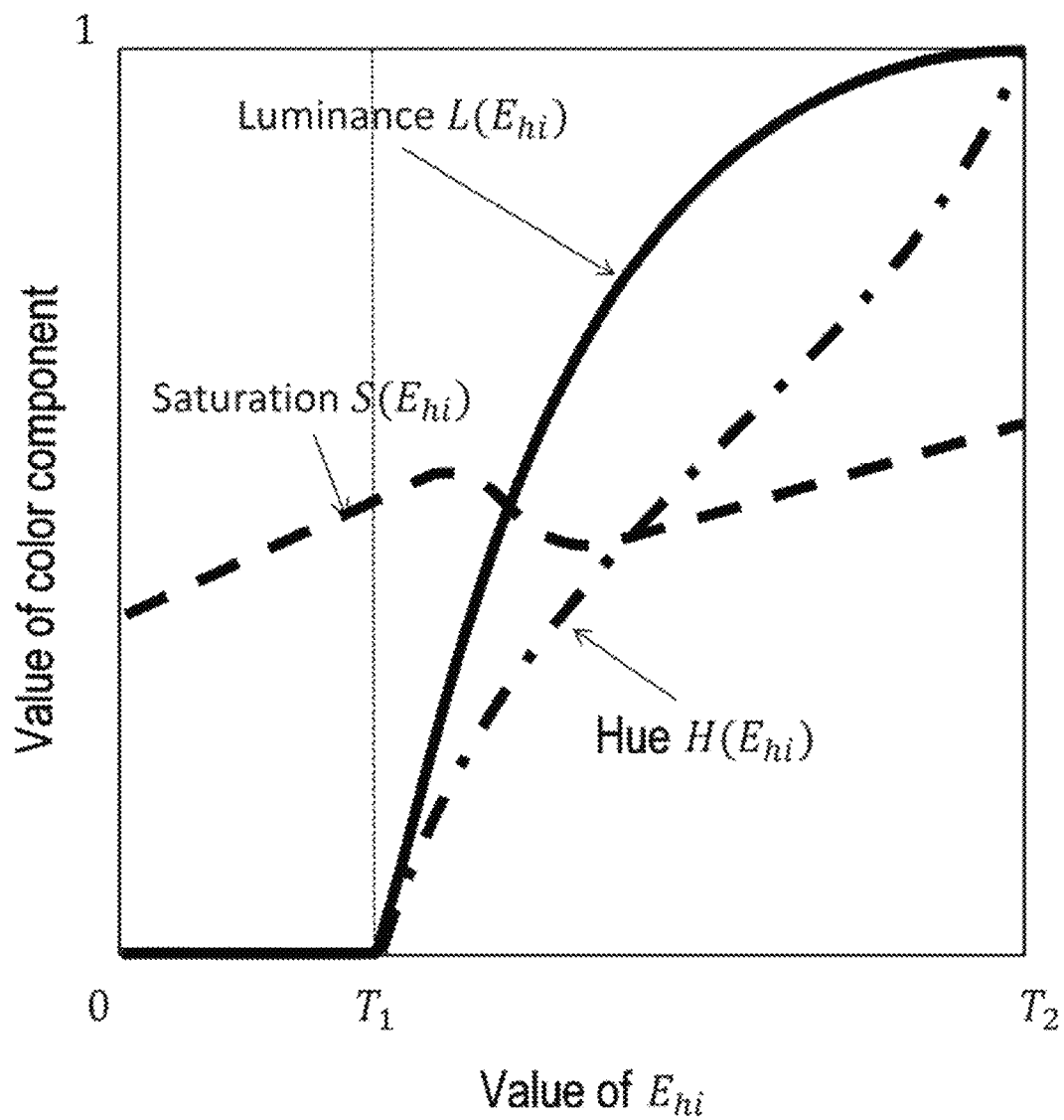

This second color map codes intensity information through a hue and a variable saturation, and an increase in luminance (0 for any value $v < T_1$). FIG. 6b illustrates the trend of the value of each color component (luminance, saturation, hue) for the value to be coded for the color map of the high-intensity image.

Two scale factors $f_x \in \mathbb{R}^+$ and $f_y \in \mathbb{R}^+$ to be applied to the axes x and y respectively, to redimension the image to the display. If $f_x$ (respectively $f_y$) is greater than 1, then the image is enlarged ("zoom in" effect), otherwise it is shrunken ("zoom out"). These scale factors are either predefined or controlled by the operator/user through a graphical or physical interface such as a keyboard key, a button, a thumb wheel or a potentiometer for example.

After a first step (300) of acquisition and formatting of the image data according to the function $I: \mathbb{R}^2 \mapsto [A, B]$; (x, y)→I(x, y), the method allows (302) an offsetting and a clamping of the data of I to force them to lie within $[0, T_1]$:

$$E_{lo}(x,y) = \min(I(x,y) - A, T_1)$$

Figure 4A:
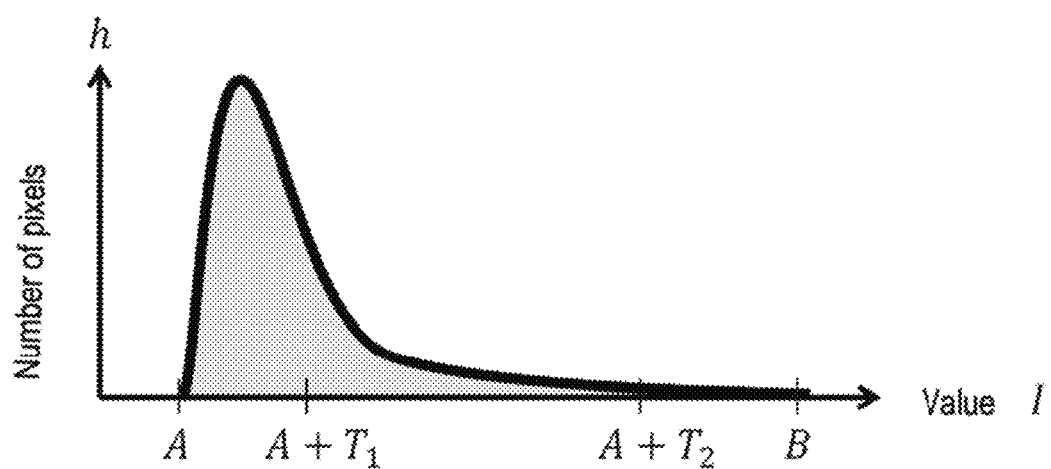
FIGS. 4a, 4b and 4c illustrate, on a histogram of values, the principle of creation of the clamped images of low intensity $E_{lo}$ and of high intensity $E_{hi}$ from an initial datum I.
Figure 4B:
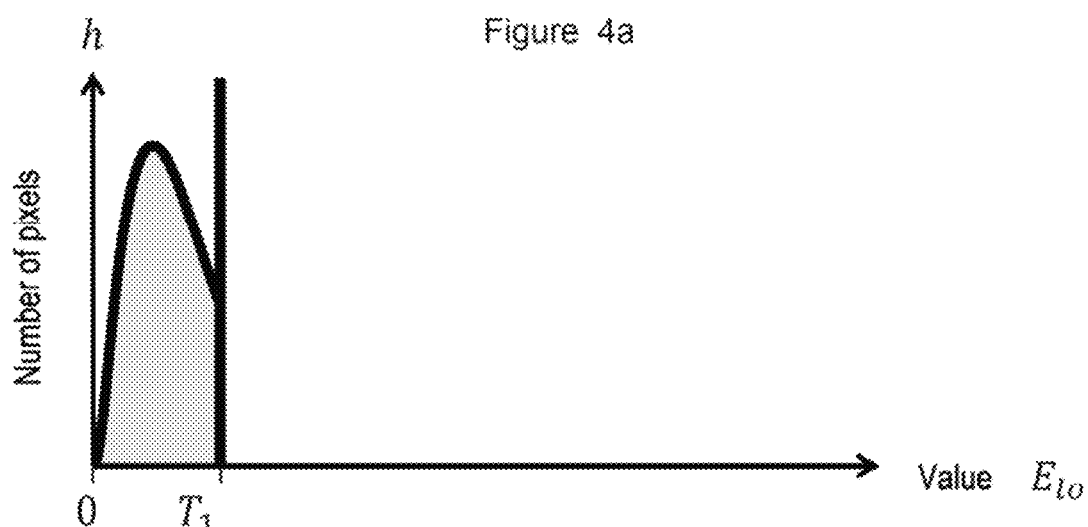

FIGS. 4a and 4b illustrate, on a histogram of values, the principle of construction of I and of $E_{lo}$ for the creation of the clamped images of low intensity $E_{lo}$ from an initial datum I. Thus, in FIG. 4a, h(I) is the number h of pixels having the value I. It can be seen that the value of h(I) is non-zero between [A, B] for I. In FIG. 4b, it is shown that the values $h(E_{lo})$ are brought to between 0 and $T_1$ by translation of the histogram. There is a peak $T_1$ equal to the number of pixels greater than or equal to $A+T_1$ in I.

Once $E_{lo}$ is constructed, the data are then (304) transcoded to a first color map:

$C_{lo}(E_{lo}(x, y))$ with $C_{lo}:[0,T_1] \mapsto [0,1]^3$ as described above.

The offsetting, clamping and transcoding steps (302, 304) allow a first color image $I_{lo}(x, y)$ to be produced that corresponds to low intensities in the input signal (step 202 of FIG. 2). The value $I_{lo}(x, y)$ is therefore a color, described as a vector of three components (red, green, blue).

The following steps (306) to (314) allow a second color image $I_{hi}(x, y)$ to be produced that corresponds to high intensities in the input signal (step 204 of FIG. 2). Thus, in the step 306, the method allows $E_{hi}(x, y)$ to be initialized at zero if $I(x, y) - A < T_1$; and at $T_2$, if $I(x, y) - A > T_2$ I(X, y)−A, otherwise. That is to say that only the pixels of an intensity that is too strong to be rendered in $E_{lo}$ are retained.

Figure 4C:
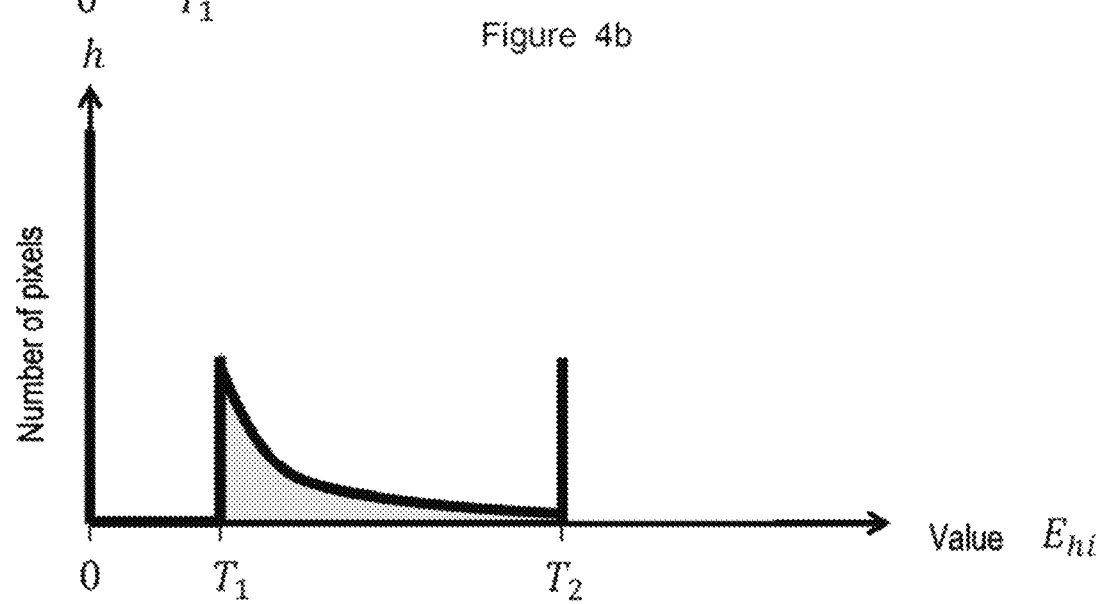

FIGS. 4a and 4c illustrate, on a histogram of values, the principle of creation of the clamped images of high intensity $E_{hi}$ from an initial datum (or image) I. FIG. 4c illustrates the histogram of $E_{hi}$ in which can be seen a first peak at zero corresponding to all the pixels of values lower than $A+T_1$ in I, and a second peak at $T_2$ corresponding to the pixels of values higher than $A+T_2$ in I, the rest of the histogram being the translation of that of h(I) (FIG. 4a).

Then, the step (308) allows the maximum to be calculated:

$m_{hi} \max_{(x,y)} E_{hi}$.

The next step (310) allows a function $B(E_{hi})$ to be applied to $E_{hi}$, which consists in performing, at each point (x, y), a non-linear low-pass filtering of the image $E_{hi}$ of unimodal impulse response that is centrally symmetrical with respect to the point (0,0).

Advantageously, the greater the value of $E_{hi}$, the greater the fuzziness or halo produced by the function B, the radius of the halo produced by said filter varying locally at (x, y) and increasing with $E_{hi}(x, y)$. $\tilde{E}_{hi}$ is used to denote the filtered version of $E_{hi}$:

$\tilde{E}_{hi} \leftarrow B(E_{hi}, r_1, r_2)$

Optionally, the fuzziness can be slaved to the resolution of the image $\rho_x$, $\rho_y$ and of the scale factors $f_x$, $f_y$:

$\tilde{E}_{hi} \leftarrow B(E_{hi}, r_1, r_2, f_x, f_y, \rho_x, \rho_y, b_f, b_p)$ In one implementation, the filtering function is defined as being:

$B(E_{hi}, r_1, r_2, f_x, f_y, \rho_x, \rho_y, b_f, b_p) = \iint_{(u,v) \in \mathbb{R}^2} E_{hi}(x-u, y-v) h(u, v, E_{hi}, x, y, r_1, r_2, f_x, f_y, \rho_x, \rho_y, b_f, b_p) du dv$ in which the local 2D impulse response h of the filter, finite or infinite, has the following characteristics:

The impulse response is splittable, i.e. the 2D filtering can be performed like a 1D filtering with a non-linear filter $h_x$ on the axis x followed by another filtering $b_y$ on the other axis:

$A(E_{hi}) = \int_{u \in \mathbb{R}} E_{hi}(x-u, y) h_x(u, E_{hi}, x, y, r_1, r_2, f_x, f_y, \rho_x, \rho_y, b_f, b_p) du$ $B(E_{hi}) = \int_{v \in \mathbb{R}} [A(E_{hi})](x, y-v) h_y(v, E_{hi}, x, y, r_1, r_2, f_x, f_y, \rho_x, \rho_y, b_f, b_p) dv$ The impulse response $h_x$ (respectively $h_y$) has the value 1 when u (respectively v) has the value 0 and decreases symmetrically around 0 as a function of u (respectively v): it is unimodal and centrally symmetrical.

The typical spatial support of each of these filters, that is to say the width of the region in which the impulse response of the filters is significantly greater than zero is proportional to a radius $r_x$ (on the axis x) and $r_y$ (on the axis y).

These radii $r_x$ (on the axis x) and $r_y$ (on the axis y) are variable as a function of the coordinate (x,y) which renders the filter non-linear and they follow the following relationships:

$$r_x(E_{hi}(x, y), r_1, r_2, f_x, \rho_x, b_f, b_\rho) = k_x(\rho_x, f_x, f_y, b_f, b_\rho) r(E_{hi}(x, y), r_1, r_2)$$

$$r_y(E_{hi}(x, y), r_1, r_2, f_y, \rho_y, b_f, b_\rho) = k_y(\rho_y, f_y, b_f, b_\rho) r(E_{hi}(x, y), r_1, r_2)$$

with $r(0, r_1, r_2, f_x, \rho_x, b_f, b_\rho) = r_1$, $r(T_2, r_1, r_2, f_x, \rho_x, b_f, b_\rho) = r_2$, the function r increasing (possibly by levels) with the values of $E_{hi}(x,y)$.

Figure 5:
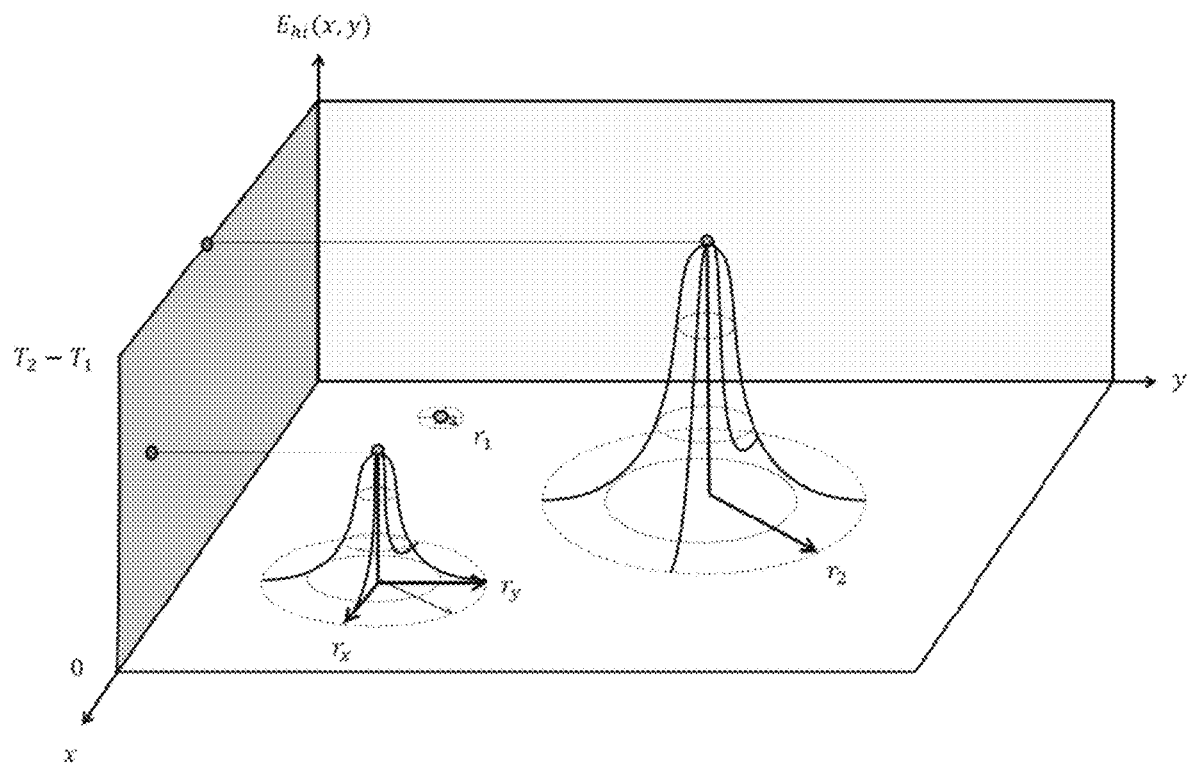
FIG. 5 illustrates the principle of the non-linear filtering.

FIG. 5 illustrates the principle of the non-linear filtering implemented in the method of the invention. As can be seen, the width r of the impulse responses is dependent on the value of $E_{hi}(x, y)$ and varies between $r_1$ and $r_2$.

The terms $k_x$ and $k_y$ are proportionality factors that are functions of the resolution on the two axes $\rho_x$, $\rho_y$, and of the scale factors $f_x$ and $f_y$. These proportionality factors can be chosen according to several strategies:

either $k_x = k_y = k$, the constant k expressed in pixels being either predefined in a parameterizing file for example, or left to the operator as a parameter setting; in this case, the filter is independent of the resolution of the input image and the impulse response of B is of identical size on both axes. This option is used when the operator performs an action to toggle a Boolean to "false" through a graphical or physical interface such as a button.

or $k_x = \rho_x \times k$ and $k_y = \rho_y \times k$, the constant k expressed in meters being either predefined in a parameterizing file for example, or left to the operator as a parameter setting. In this case, the filter is dependent on the resolution of the input image and the impulse response of B is no longer of identical size on both axes. This option is used when the operator performs an action to toggle a Boolean to "true" through a graphical or physical interface such as a button.

It is also possible to have a dependency of $k_x$ and $k_y$ on the scale factors $f_x$ and $f_y$. For example, if the scale factors increase ("zoom in") it is advantageous to reduce $k_x$ and $k_y$ in order to reduce the radius of the halo induced by B; and vice versa in a "zoom out" case or there is a desire on the contrary to increase the radius of the halo.

Moreover, the form and the exact implementation of the filter is unimportant provided that the characteristics are borne out. Two examples of filters are given:

$$h_x(u, E_{hi}, x, y, r_1, r_2, f_x, \rho_x, b_f, b_\rho) = \exp\left(-\frac{u^2}{r_x\left(\frac{E_{hi}(x, y), r_1, r_2,}{f_x, \rho_x, b_f, b_\rho}\right)^2}\right);$$

$$h_y(v, E_{hi}, x, y, r_1, r_2, f_y, \rho_y, b_f, b_\rho) = \exp\left(-\frac{v^2}{r_y\left(\frac{E_{hi}(x, y), r_1, r_2,}{f_y, \rho_y, b_f, b_\rho}\right)^2}\right);$$

Th exponential filter with:

$$h_x(u, E_{hi}, x, y, r_1, r_2, f_x, \rho_x, b_f, b_\rho) = \exp\left(-\frac{|u|}{r_x\left(\frac{E_{hi}(x, y), r_1, r_2,}{f_x, \rho_x, b_f, b_\rho}\right)}\right);$$

$$h_y(v, E_{hi}, x, y, r_1, r_2, f_y, \rho_y, b_f, b_\rho) = \exp\left(-\frac{|v|}{r_y\left(\frac{E_{hi}(x, y), r_1, r_2,}{f_y, \rho_y, b_f, b_\rho}\right)}\right);$$

The person skilled in the art will understand that the implementation of these filters can undergo various known optimizations, notably to speed up the computation speed, but which in no way alter the essence of the invention.

Returning to FIG. 3, after the filtering step, the maximum of $\tilde{E}_{hi}$ is different from that of $E_{hi}$. The method allows (312) renormalization of the image (linearly) so that its maximum once again becomes $m_{hi}$:

$$\overline{E}_{hi}(x, y) = \frac{\tilde{E}_{hi}(x, y)}{\max_{x,y} \tilde{E}_{hi}} m_{hi},$$

then the data to be transcoded (314) to a second color map:

$$I_{hi}(x, y) = C_{hi}(\overline{E}_{hi}(x, y))$$

with $C_{hi}: [0, T_2 - T_1] \to [0, 1]^3$ as described above. The value $I_{hi}(x,y)$ is therefore a color, described as a vector of three components (red, green, blue).

In a subsequent step (316), the method allows a merged color image O(x, y), to be calculated, defined as the average weighted by $\alpha$, for each of the three components (red, green, blue):

$$\tilde{O}(x, y) = (1-\alpha) I_{lo}(x, y) + \alpha I_{hi}(x, y)$$

This color image contains low-intensity data combined with high-intensity data surrounded by a halo, the halo having been obtained previously in the step 310.

The method then allows (318) renormalization of the merged image in order to retrieve the luminance of the low-intensity image:

$$\overline{O}(x, y) = \tilde{O}(x, y) \times \frac{L(I_{lo}(x, y))}{L(\tilde{O}(x, y))}$$

In a subsequent step (320), the method allows the normalized image to be redimensioned according to scale factors, a factor $f_x$ on the x axis and a factor $f_y$ on they axis, by application of a redimensioning algorithm R: $O \leftarrow R(\overline{O}, f_x, f_y)$ This step uses, conventionally, but not exclusively, a spectrum, anti-aliasing low-pass filter followed by a resampling.

The method then allows the redimensioned image obtained $O: \mathbb{R}^2 \mapsto [0,1]^3$; (x, y)→O(x, y) to be visualized (322), by display or printing for example.

In variant embodiments, different algorithmic processes can be inserted between the steps of redimensioning (320) and of visualization (322), between the steps of clamping (302) and of transcoding (304), or even before the clamping step, without affecting the principles of the image rendering method of the invention.

The method proposed is a variant of HDR rendering which is optimized by the addition of filtering step (204) or (306 to 314) and by a shrewd choice of the color maps $C_{lo}$ and $C_{hi}$, not in monochromatic hues (with constant hues and saturations) but, on the contrary, and above all for $C_{hi}$, in a rich color palette.

Thus, the method of the invention offers the following advantages:

unlike the conventional HDR rendering, the fact of applying a non-linear low-pass filtering to the "high-intensity" part of the image (contained in the datum $E_{hi}$) allows the spatial support of the pixels of high intensity to be increased. Thus, for example in the field of radar or of a sonar, if a punctual strong echo is present, it will be highlighted because its spatial support will be increased; it will therefore be more perceptible even when the image is resampled ("zoom out") in the step (320).

Typically choosing the palette of colors $C_{lo}$ as a gradient of colors of constant hue and saturation in order to approximate the conventional rendering for weak echoes which constitute most of the scene. By contrast, for a few strong echoes rendered in tones of the palette of colors $C_{hi}$, the fact of choosing rich and varied hues allows the intensity of the strong echoes to be directly coded, which allows the operator to perform an action of appreciation of the force of the echoes by the relationship: intensity-color. The impression of force of the echoes is also reinforced by the fact of the spatial support of the halo surrounding these echoes. The highlighting of the echoes can contribute to a lightening of the cognitive load of the operator in analyzing the scene.

The fact of being able, through a simple action of activation of an option, to link the size of the halo obtained (constants $k_x$ and $k_y$) to the visualization scale parameters $f_x$, $f_y$, advantageously allows the operator to perform two types of tasks with the visualization scale $f_x$, $f_y$ as the sole command, typically entered through a peripheral device (keyboard keys, thumb wheel of a mouse, etc.). These two tasks are:

visual detection of the strong echoes, which are potentially targets, when the "zoom out" is significant and the operator perceives the scene as a whole, or at least over a wide horizon. This function is possible if the "halo" effect is significant, which allows "far echoes to be seen" whereas, without the filtering step, these echoes would disappear through the scaling;

visual analysis of the structure of the echoes, when the "zoom" level coded by the factors is significant, and in which the operator is more interested in the distribution of significant signal pixels (known to the person skilled in the art as "bright points") along the targets, and for which a high level of spatial precision is important: in this case, the "fuzzy" effect provided by the non-linear low-pass filtering step must be reduced, but it should be strong enough to increase the understanding of the scene compared to what would be provided by the use of a conventional HDR method without the non-linear filtering step, and even more so than with the LDR method (in which a target is typically a blob of pixels ("pixel blob") of uniform color, because of the clamping step bringing all the strong pixels to a single value).

The fundamental factor of using a palette $C_{lo}$ of colors in which the hue and the saturation are essentially constant, and a palette $C_{hi}$ of rich colors with increasing luminance, also allows for an interesting effect, through the weighted average step (316) followed by the renormalization performed in the step (318). In fact, the weighted average allows the presence of a strong echo to be appreciated without in any way masking the presence of weak signal pixels nearby, which will still be rendered with the same luminance as in the "low intensity" image because of the ensuing renormalization. This effect is important because, in radar and in sonar, a weak signal provides information on the scene generally through a shadow. Without this shrewd choice of palettes, the shadow could disappear.

Figure 7:
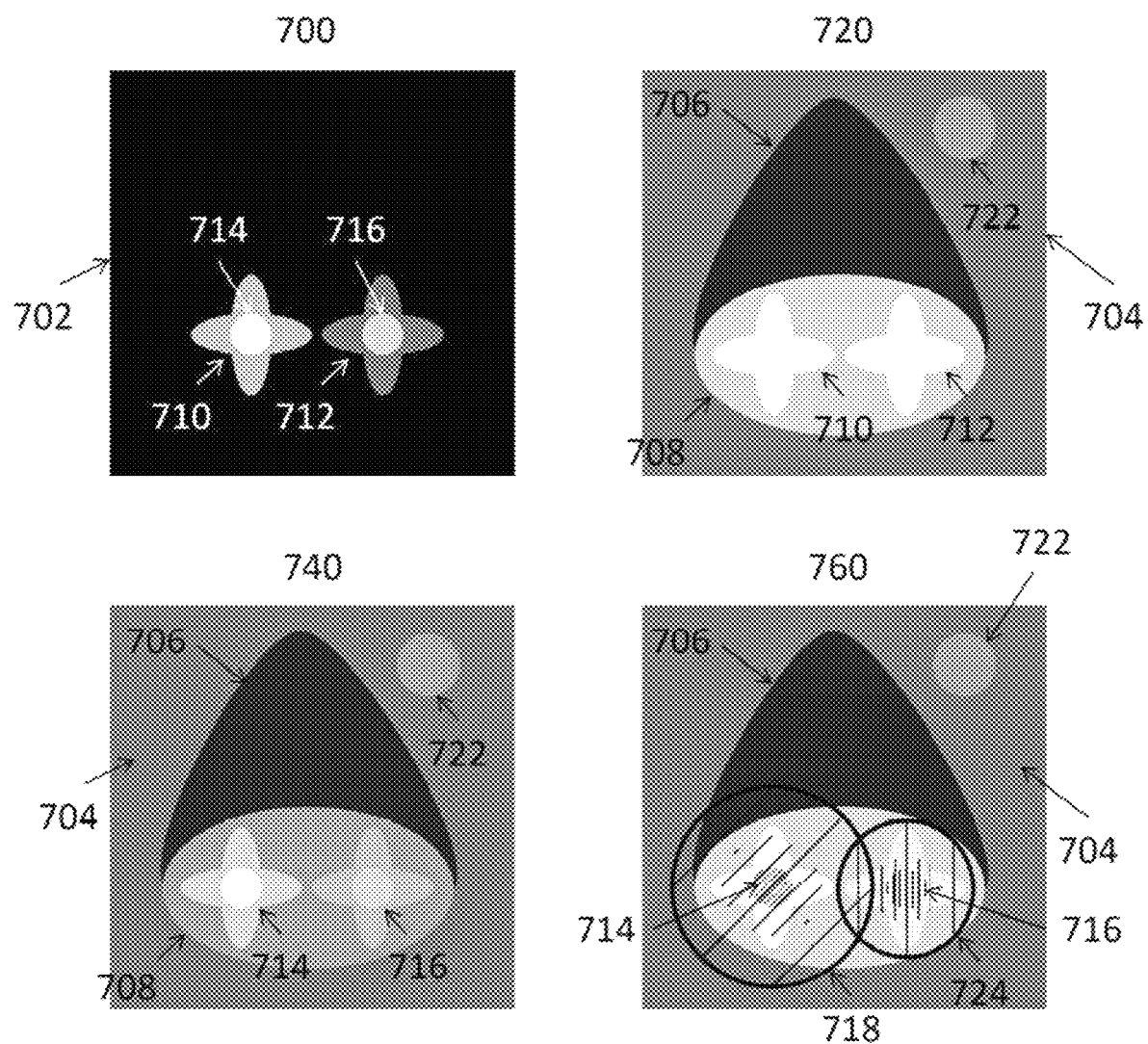
FIG. 7 illustrates the raw rendering of a sonar or radar pseudo-image by the standard LDR and HDR rendering techniques compared to the rendering obtained by the method of the invention.

FIG. 7 illustrates the raw rendering of a sonar or radar pseudo-image by the standard LDR (700, 720) and HDR (740) rendering techniques compared to the rendering (760) obtained by the method of the invention. The references representing the same elements are identical in the different image rendering results.

In the LDR rendering (700), an interval [A, B] is mapped linearly to a luminance interval [0,1]. In this precise case, only rare bright points (710) and (712) are perceived. It is found that the bright points (710) and (712) are generally composed of a central peak (714), (716) and a "base" physically created by the side lobes of the antenna or a pulse compression processing. In the example illustrated, the two bright points are of different intensity, the bright point on the right (712) being of a lesser intensity than the bright point on the left (710), so it is then rendered in the image with a luminance less close to the white. By contrast, the rest of the image (702) in which the raw datum is of very low intensity, is rendered by a color of luminance close to zero (black). It is therefore impossible in this LDR rendering approach to perceive other objects in the scene. That is the limitation of linear rendering.

The LDR rendering (720) illustrates the result of the clamping of a pseudo-image symbolizing a sonar or radar image. The clamping reveals a zone of very dark shadow (706), a zone of dark reverberation corresponding to the ground (704), an isolated intermediate echo (722), a zone of medium intensity echo (708) greater than the isolated echo (722). These elements were not visible in the linear rendering (700). The two bright points (710) and (712) are, in this approach, brought to the same intensity and appear identical, not showing a difference of intensity between their central peak (714, 716, not visible) and their base. It is therefore impossible in this approach to compare the intensity of the received signal for the two bright points.

The HDR rendering (740) of a sonar or radar pseudo-image differs from the preceding LDR rendering (720) by the fact that the "tone mapping" allows bright points (710, 712) to be brought selectively to lower luminance levels, thus allowing their structure—peaks (714, 716) and bases—to be appreciated and the luminance of the zone of median intensity echo (708) to be selectively reduced to the same level as that used to represent the isolated echo (722) because it is close to the bright points (710, 712). One drawback with this type of HDR rendering is that the spatial surface of the peaks (714, 716) remains very modest. Another drawback is that the luminance level used to render the echoes (708, 722) is identical whereas the intensity of the raw data is different, which does not allow the relative intensities of the objects to be compared.

FIG. 7 symbolically illustrates, bottom right (760), the rendering of a sonar or radar pseudo-image by application of the method of the invention. Thus, the rendering of the low-intensity elements (704), (706), (708) and (722) is performed by conserving a relationship of order between the luminances (with respect to the intensity of the raw datum), unlike the HDR rendering (740). The rendering of the high-intensity elements is done by prioritizing the use of the hue and the saturation of the colors, instead of the luminance, which is symbolized by shading lines, used to render the peaks of the bright points (714) and (716), the difference in these hues and saturation coding the signal level. Finally, the spatial extent of the peaks (714) and (716) is increased by the halo effect, symbolized by the shaded circles (718) and (724), the radius of which increases with the intensity of the peaks. This halo effect is configured to use mainly the color and not mask the shadows (706) in the step of combining the high-intensity and low-intensity images.

The person skilled in the art may think that the method is inspired by the halo effect produced in optical imaging by the "blooming" effect.

As a reminder, blooming or "glare" is an effect which results from physical and physiological causes in the human eye resulting from the diffusion of the light in the cornea, the retina or else the lens of the measuring apparatus and the diffraction in these same media. These effects provoke a light halo around very bright objects in a scene, which mask the objects that are not very bright situated nearby. This effect can be modeled by the convolution of a radiometric image with an impulse response function P(θ) dependent on the angle θ formed by the straight line $(SI_S)$ and the straight line (S, I) in which S is the position of the light source in the scene, $I_S$ is the image of the source on the plane of the sensor (CCD, retina), and I is any other point of the plane of the sensor. The impulse response is:

$$P(\theta) = a\delta(\theta) + \frac{k}{F(\theta)}$$

with δ the Dirac distribution, a the fraction of light not diffused, and F a function of the angle θ which determines the diffusion (with ʃk/F(θ) typically having a value of 10% for a human observer). Several models exist for F, including in particular the Vos model described in Greg Spencer; Peter Shirley; Kurt Zimmerman; Donald P. Greenberg (1995), "Physically-based glare effects for digital images". Siggraph: 325. doi:10.1145/218380.218466. ISBN 0897917014. It should be stressed that the perceived radius of the halo depends on the angle θ subtended by the object at the position of the observer or, in an equivalent manner on the distance from the observer (from the sensor) to the light source. In sonar and in radar, this phenomenon does not occur. So, the blooming as currently known from the literature is not an effect which is added in the representation of the sonar or radar images.

Simulation of the blooming is commonly performed these days in the field of video gaming in order to increase the sensation of realism and the perception of the intensity of a light source. This rendering is generally performed in real time through a program called "shader" on a graphics card. This simulation of blooming is routinely added as a stage following that of an HDR rendering, but solely for the simulation of optical images.

The method proposed differs substantially from this method by the fact that the law used to calculate the radius of the halo does not depend on the distance from the observer to the target nor on the angles subtended thereby, but depends on other parameters with a formulation shrewdly chosen to produce effects that increase the visibility of the targets. This does not involve the known "blooming" for the following reasons. First of all, the proposed method does not use the physical equations of blooming, and notably the impulse response of the filter used in the step (310) varies as a function of the intensity of the signal which is not the case with blooming. Furthermore, contrary to the simulation of the blooming routinely used in the field of video gaming, the size of said impulse response can be shrewdly parameterized and linked to the scale of the image in order to produce two interesting effects as a function of said scale: the detection of strong echoes with reduced resolution, and the analysis of the bright points of the targets, at full resolution. Finally, and fundamentally, the blooming, by the very fact that it corresponds to a glare, masks the presence of a weak signal in the vicinity of a strong signal pixel, which is specifically not the case with the present method if the palettes of colors $C_{lo}$ and $C_{hi}$ are shrewdly chosen as described above.

The invention claimed is:

1. An image rendering method for matrix data I from an input signal having a high dynamic range, the method implemented by a computer, comprising the following steps:
   generating, from initial matrix data, a first color image being a low intensity image, wherein one or more colors in said first color image represent low intensities of the input signal;
   generating, from the initial matrix data, a second color image being a high intensity image, wherein one or more colors in said second color image represent high intensities of the input signal, said generating step comprising at least one filtering step comprising applying, at each point (x, y) of the second color image, a non-linear low-pass filter of unimodal impulse response, centrally symmetrical with respect to a point of coordinates (0,0);
   generating a merged color image combining, point-for-point, the low-intensity image and the high-intensity image in an average, weighted by a constant factor, of each of the one or more colors in said low-intensity image and said high-intensity image;
   normalizing the merged color image so that, at each point, a luminance of a resulting normalized image is equal to a luminance of the low-intensity image; and
   redimensioning the resulting normalized image on at least one axis of a matrix.

2. The method as claimed in claim 1, wherein the step of generating a low-intensity image comprises constructing a first temporary matrix equal to an original image I from which is subtracted its minimum A, then constructing a second temporary matrix equal to the first temporary matrix, except for inputs with values higher than a predefined threshold $T_1$, said inputs being set at $T_1$, then constructing a low-intensity color image from the second temporary matrix, by application of a first palette of colors.

3. The method as claimed in claim 2, wherein the step of generating a high-intensity image comprises the following steps:
   calculating a third temporary matrix, equal at all points to the first temporary matrix, except for inputs with values lower than the predefined threshold $T_1$, said inputs being set at zero, and except for inputs with values higher than a threshold $T_2$, said inputs being set at $T_2$;
   calculating a maximum of the third temporary matrix;
   applying, to the third temporary matrix, a non-linear low-pass filtering of unimodal impulse response, centrally symmetrical with respect to the point of coordinates (0,0);
   dividing, point-by-point, a result of the non-linear low-pass filtering by an overall maximum of this result, and multiplying by the maximum of the third temporary matrix; and
   constructing a high-intensity color image by application of a second palette of colors to a result of the dividing step.

4. The method as claimed in claim 1, wherein the redimensioning of the resulting normalized image comprises an upsampling or a downsampling on at least one of two axes, by factors which are either predefined, or left to control of an operator.

5. The method as claimed in claim 1, wherein typical widths of the impulse response of the non-linear low-pass filter on two horizontal and vertical axes of the matrix of the image depend on spatial resolution of input data along said two axes.

6. The method as claimed in claim 1, wherein typical widths of the impulse response of the non-linear low-pass filter on two horizontal and vertical axes of the matrix of the image depend on a rate of upsampling or downsampling of the image on the two axes.

7. The method as claimed in claim 1, wherein a palette of colors used to generate the low-intensity image is of essentially constant hue and saturation and coding of data is performed by a variation of luminance, which increases with intensity of the input signal.

8. The method as claimed in claim 1, wherein the input signal is preconditioned so that its average on a local horizon is constrained to a target value m, and wherein a luminance of a palette of colors used for the low-intensity image follows a log-sigmoid law.

9. The method as claimed in claim 1, wherein a palette of colors used to generate the high-intensity image is, on the one hand, of essentially zero luminance for $I(x, y) \leq A+T_1$ and increases with $I(x, y)$, and, on the other hand, of variable hue and saturation, a variation of hue and of saturation coding signal intensity information.

10. The method as claimed in claim 1, wherein the impulse response of the non-linear low-pass filter is a 2D Gaussian function whose standard deviation is a "typical width" parameter.

11. The method as claimed in claim 1, further comprising a step of displaying or printing the redimensioned image.

12. An image rendering device for matrix data from an input signal having a high dynamic range, comprising means for implementing the steps of the method as claimed in claim 1.

13. A non-transitory processor-readable storage medium, on which is stored a computer program, said computer program comprising code instructions configured to implement the steps of the method as claimed in claim 1, when executed by the computer.

* * * * *